United States Patent [19]

Gee

[11] 3,854,556

[45] Dec. 17, 1974

[54] ANTI-SKID SYSTEM HAVING IMPROVED SENSOR

[75] Inventor: Thomas A. Gee, Allen Park, Mich.

[73] Assignee: Eaton Corporation, Cleveland, Ohio

[22] Filed: Dec. 27, 1973

[21] Appl. No.: 428,709

[52] U.S. Cl. .............. 188/181 R, 303/CF, 310/156, 340/263
[51] Int. Cl. ............................................. B60t 8/08
[58] Field of Search ..... 188/181 R; 310/156; 317/5; 324/161, 162, 163, 166; 340/262, 263

[56] References Cited
UNITED STATES PATENTS

| | | | |
|---|---|---|---|
| 3,563,351 | 2/1971 | Leiber | 188/181 R |
| 3,750,128 | 7/1973 | Sapir | 340/263 |
| 3,796,899 | 3/1974 | Giachello | 310/156 |

*Primary Examiner*—Duane A. Reger
*Attorney, Agent, or Firm*—Teagno & Toddy

[57] ABSTRACT

An anti-skid system is disclosed having an improved wheel speed sensor. The sensor provides a frequency signal proportional to wheel velocity. The anti-skid circuit operates in dependency upon the value of the velocity signal to provide an anti-skid signal which is supplied to a brake control system for relieving brake forces applied to the wheel. The improved sensor is a variable reluctance voltage generator comprising a stator and a rotor. The rotor is mounted on the vehicle wheel so as to rotate therewith in close proximity to the stator. The rotor is made of ferromagnetic material and is provided with an annular array of rotor teeth. The stator includes three members defining a source of magnetic flux and a split magnetic path therefor. Two of the members are mounted so as to face the rotor to define a magnetic air gap therebetween. The members are oriented and configured such that a reluctance change in the first and second members caused by rotation of the rotor is essentially 180° out of phase while the reluctance change caused by like changes in the air gap spacing is essentially in phase. A coil has winding portions located on the stator to provide an output voltage having its maximum value when the reluctance changes are 180° out of phase.

14 Claims, 5 Drawing Figures

3,854,556

ANTI-SKID SYSTEM HAVING IMPROVED SENSOR

This invention relates to an anti-skid system having an improved sensor assembly for sensing the angular velocity of a rotating body and more particularly the angular velocity of a wheel controlled by an anti-skid system in dependence upon the wheel velocity and/or derivatives thereof.

Anti-skid systems typically employ a wheel speed sensor associated with each vehicle wheel being controlled. Each sensor provides a frequency signal exhibiting a frequency proportional to the angular velocity of its associated wheel. The frequency signal is then converted into an analog D.C., signal having a magnitude proportional to the frequency and, hence, the angular velocity of the wheel. The frequency signal may be shaped for use as digital pulses for use by digital anti-skid circuitry. This signal, in turn, is applied to anti-skid circuitry which, in dependence upon its value, analog or digital, and derivatives thereof and perhaps of that of other signals, provides a skid signal. This skid signal is then employed to relieve the braking forces applied to the controlled wheel. Since the provision of the skid signal depends upon the sensed angular velocity of one or more wheels, it is exceedingly important tat the sensor assembly provide a frequency signal which exhibits a high degree of accuracy.

Sensor assemblies for anti-skid systems known in the art typically employ electromagnetic sensors including a ferro-magnetic toothed rotor mounted on a wheel for rotation therewith and a stator mounted on the brake assembly. The stator is typically a single magnetic flux path device provided with a source of magnetic flux, either an electromagnet or a permanent magnet. The rotor provides the means for varying the flux path for the stator and thereby changes the flux level in the path. For example, the stator may be a C-shaped body. Each leg of the C-shaped body would face the rotor with the pole faces of the C-shaped body being in phase; to wit, each faces a tooth or a tooth space or a combination thereof at the same time. As the rotor rotates past the pole faces of the C-shaped body, a flux change induces a signal in the sensing coil. The induced signal occurs at a frequency proportional to the angular velocity of the rotor. The value of the signal depends on the air gap as well as the angular velocity. Depending upon the type of anti-skid system employed, the air gap may be an axial air gap or a radial air gap. In either case, variations in the size of the air gap during operation may provide false information or noise. If the circuitry associates the false information or noise with angular velocity, then an improper skid signal may result. Thus, axial vibrations may cause frequency signals interfering with the primary source of information; to wit, angular velocity of the wheel. Variations in the size of an air gap may result from sensor or wheel component relative vibrations.

It is a primary object of the present invention to provide an improved wheel velocity signal generator for use in an anti-skid system exhibiting a high signal to noise ratio.

It is a still further object of the present invention to provide an improved wheel speed sensor which employs a magnetic structural arrangement and sensing coil to provide an output signal having a frequency proportional to the angular velocity of an associated toothed rotor while at the same time being relatively non-responsive to variations in the air gap therebetween.

In accordance with the broader aspects of the present invention, the sensor assembly includes a stator and rotor. The rotor has an annular array of spaced ferromagnetic teeth. The stator employs three members which define a source of magnetic flux and a split magnetic circuit. The three members are oriented so that the two members have pole faces which cooperate with associated teeth on the rotor such that the reluctance change at the respective pole faces is 180° out of phase. A sensing coil is provided having two winding portions respectively wound on the two members. These winding portions are connected in series so that induced voltages at the two legs which are out of phase by essentially 180° are additive, whereas in phase induced voltages caused, by changes in the air gap distance, are subtractive.

DESCRIPTION OF THE DRAWINGS

The foregoing and other objects and advantages of the invention will become more readily apparent from the following description of the preferred embodiments of the invention taken in conjunction with the accompanying drawings which are a part hereof and wherein.

DESCRIPTION OF THE PREFERRED EMBODIMENTS

Figure 1:
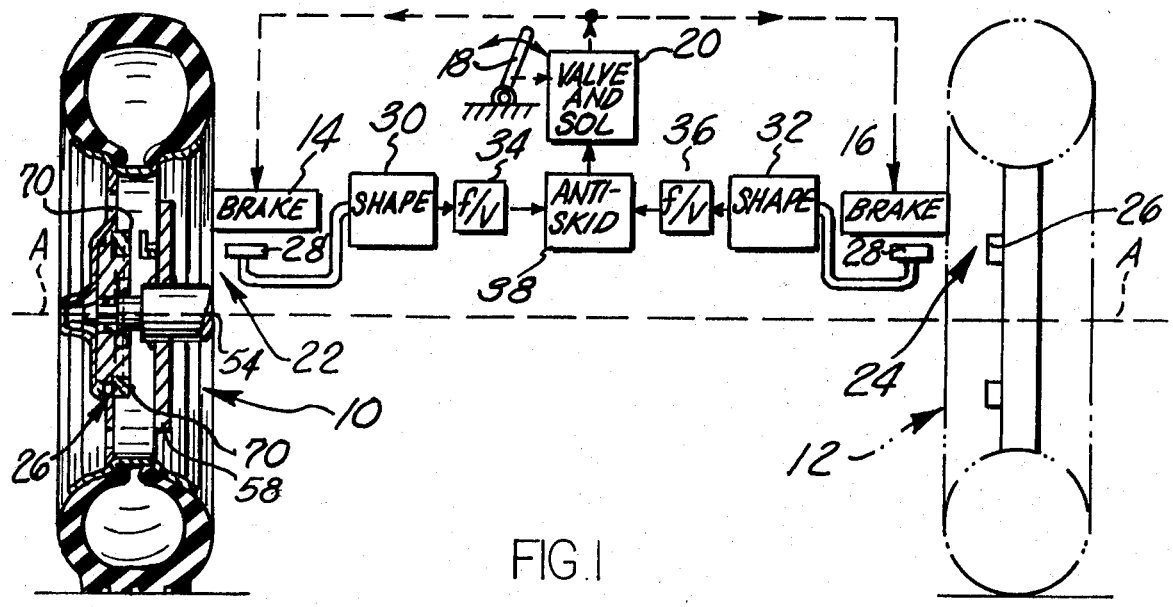
FIG. 1 is a schematic-block diagram illustration of an anti-skid system to which the present invention may be applied.

Referring now to the drawings and more particularly to FIG. 1, there is schematically illustrated an anti-skid system for relieving braking forces applied to two independently rotatable wheels 10 and 12 mounted for rotation on an axle A. Brake assemblies 14 and 16, which are only schematically illustrated herein, are associated with wheels 10 and 12 respectively. These brake assemblies are operated in a conventional fashion by an operator actuating a peddle 18 to, in turn, operate a valve 20. This valve is connected to a source of fluid under pressure to operate the brake assemblies 14 and 16 to apply braking forces to wheels 10 and 12. Wheels 10 and 12 are respectively provided with wheel velocity sensors 22 and 24.

Each sensor assembly includes a rotor 26 carried by its associated wheel and a stator 28. As will be described in greater detail hereinafter, each stator provides an output frequency signal exhibiting a frequency proportional to the angular velocity of the associated vehicle wheel. The frequency signal from sensor assemblies 22 and 24 are shaped by suitable shaping circuits 30 and 32 to provide square wave pulse trains having a substantially constant amplitude but of a frequency dependent upon the angular velocity of the associated wheel. The shaped signals from shaping circuits 30 and 32 are applied to frequency-to-voltage converter circuits 34 and 36. Each frequency-to-voltage converter serves to provide a D.C. voltage signal having a magnitude proportional to the frequency of the shaped signal and, hence, proportional to the angular velocity of the associated wheel. These voltage signals are applied to an anti-skid circuit 38. The anti-skid circuit includes circuitry for receiving these voltage signals and providing a skid signal in dependence upon the voltage signals having values relative to each other indicative of an incipient skid condition. This skid signal is, in turn, utilized to control the valve assembly 20 to relieve the applied braking forces. The anti-skid circuit 38 may take the form, for example, of that illustrated and described in U.S. Pat. application Ser. No. 326,676, entitled Improved Skid Control System and assigned to the same assignee as the present invention.

Figure 2:
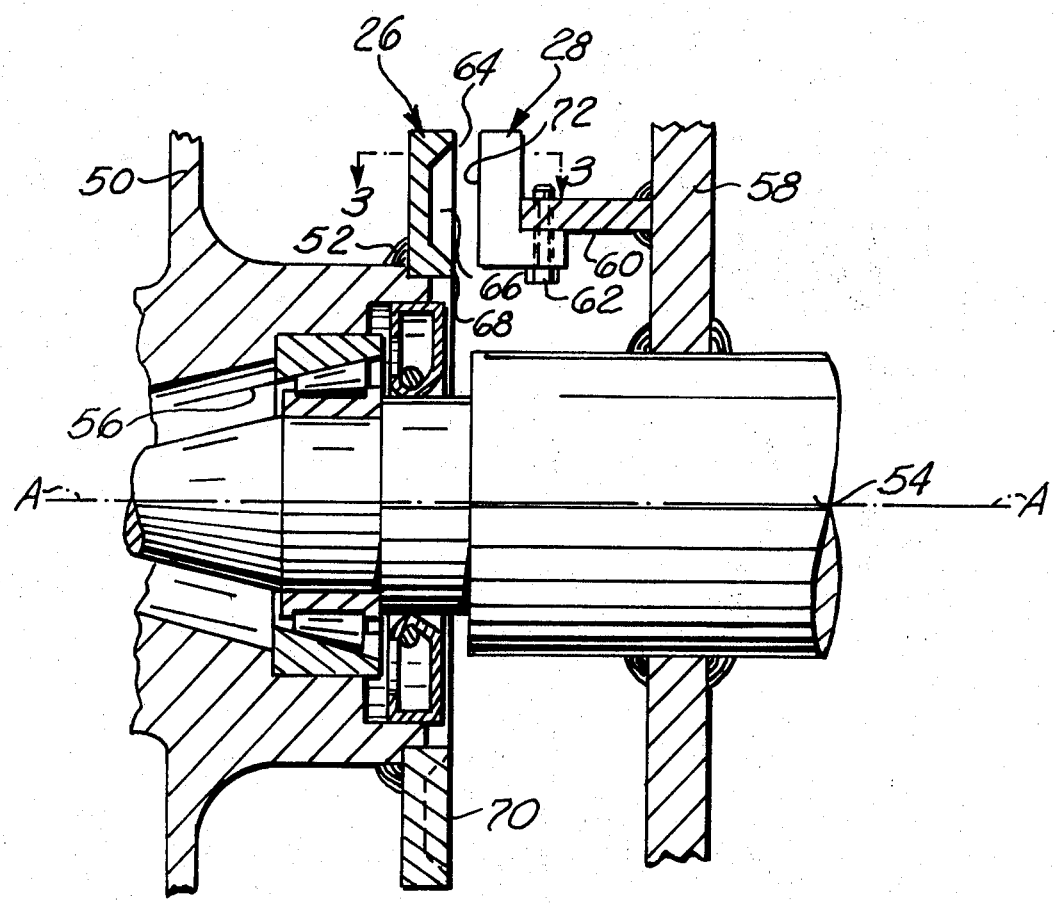
FIG. 2 is a longitudinal sectional view of a wheel-axial assembly illustrating the manner in which the sensor assembly may be mounted.

Reference is now made to FIG. 2 which illustrates one manner in which the sensor assembly, in accordance with the present invention, may be mounted to an associated wheel for sensing the angular velocity thereof. As described hereinbefore, each sensor assembly includes a rotor 26 and a stator 28. The rotor preferably takes the form of an annular ring-shaped member constructed of ferromagnetic material and is mounted on a vehicle wheel 50, as by a weld 52. Wheel 50 is mounted on a nonrotatable axle 54 and rotationally supported by conventional radial thrust bearings 56. Stator 28 may be mounted to a brake mounting flange 58, as by an intermediate support member 60. The brake flange is conventional and is typically welded, or bolted, to the nonrotatable axle 54 and serves to carry the brake mechanism, not shown, for supplying braking forces to wheel 50. The intermediate support member 60 may be welded at one end to flange 58 and secured as with a bolt/nut assembly 62 to the stator 28 so that the stator is in registry with rotor 26 and axially spaced therefrom by a desired air gap 64. Rotor 26 is provided with an annular array of equally spaced apart recesses 66 located in its axial face 68. These recesses define an annular array of spaced lands or teeth 70. These face the axial face 72 of the stator 28.

Figure 3:
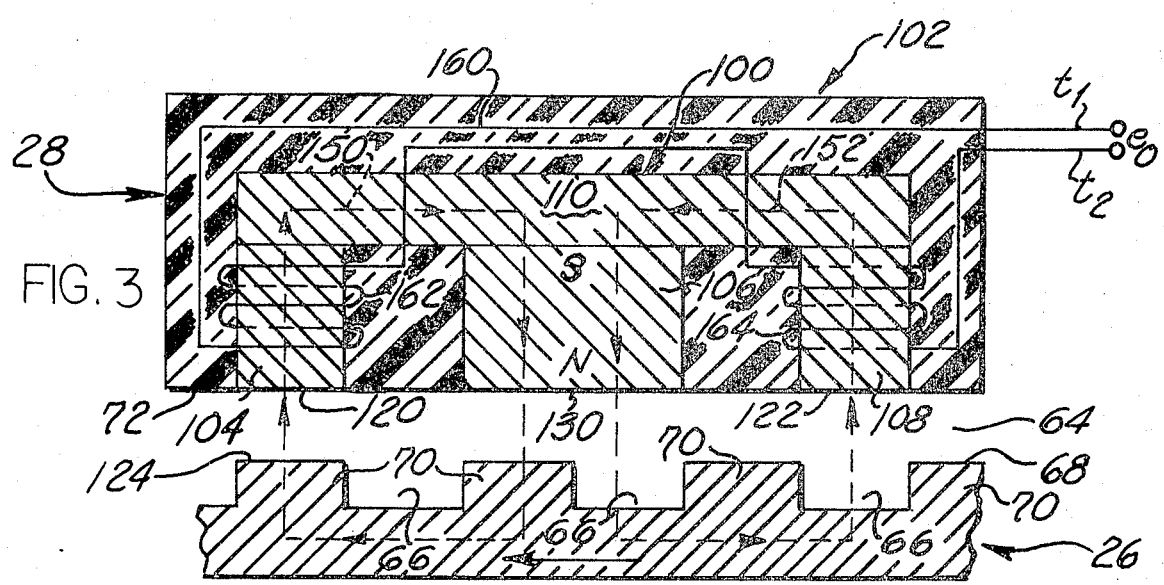
FIG. 3 is an enlarged sectional view taken generally along line 3—3 looking in the direction of the arrows in FIG. 2 illustrating the construction of one embodiment of the improved sensor assembly.

Reference is now made to FIG. 3 which illustrates the sensor assembly in greater detail than that shown in FIG. 2. Here, the stator 28 is illustrated as comprising an E-shaped member 100 which, after assembly, is encapsulated with a suitable nonconductive potting material 102 to form a rectangular insulated block or housing. The E-shaped assembly 100 includes three legs 104, 106, and 108 extending from a strap member 110. In this embodiment legs 104, 108, and strap member 110 are all constructed of ferromagnetic material and the legs may be secured to the strap member, as by welding. Leg members 104, 108 extend toward the rotor 26 and terminate in flat pole faces 120 and 122 respectively. Leg members 104 and 108 are preferably circular in cross section to assist in tightly wrapping windings thereabout. The surface area of each pole face 120 and 122 essentially corresponds with the surface area of a rectangular shaped pole face 124 on each rotor tooth 70.

In the embodiment of FIG. 3, the intermediate leg 106 takes the form of a permanent magnet so as to serve as a source of magnetic flux. The magnet need not be physically secured to strap 110 but merely located so that it is intermediate and equally spaced from pole legs 104 and 108. This center leg magnet may be circular in cross section or of rectangular cross section. In either case, its pole face 130 has a surface area essentially twice that of a pole face 124 on a rotor tooth 70. As shown in FIG. 3, the orientation of legs 104, 106, and 108 is such that when one of the stator pole faces 120 or 122 is in registry with a rotor pole face 124, the pole face 130 of the intermediate leg 106 will be in registry with a rotor pole face 124 and a rotor recess 66. In the embodiment illustrated, only two rotor teeth 70 are interposed between legs 104 and 108. This, however, is not a necessary requirement. Instead, it is only required in accordance with the invention that when a stator pole face 120 or 122 is in registry with a rotor pole face 124, the other stator pole face 120 or 122, is in registry with a rotor recess 66. This provides a 180° phase reluctance change at pole legs 104 and 108 as the rotor teeth pass through the magnetic field.

In assembly, it is preferred that the mounting of the sensor assembly be such that the air gap 64 between the rotor axial face 68 and the stator axial face 72 is uniform. During operation, axial vibrations, due to road conditions and vehicle operation, may cause changes in the distance of the air gap 64. These changes, which will be considered as noise, should not adversely affect the operation of sensing the angular velocity of rotor 26. This is achieved with a sensing coil winding orientation in conjunction with the pole arrangement.

The stator assembly includes a coil 160 having a winding portion 162 wound about a portion of the length of leg 104 and a second winding portion 164 wound about a portion of the length of leg 108. As shown in FIG. 3, the windings 162 and 164 are wound in series additive fashion so that induced voltages which are 180° out of phase are additive and induced voltages which are in phase are subtractive. Additive voltages result in an output signal $e_O$ taken across output terminals $T_1$ and $T_2$. Such additive induced voltages occur when the reluctance change at pole legs 104 and 108 is 180° out of phase. This occurs, for example, when pole face 120 is in registry with a rotor pole face 124 while at the same time pole face 122 is in registry with a rotor recess 66. There is an increase in flux change in leg 104 while a decrease takes place in leg 108. Since these are 180° out of phase, the induced voltages are additive to provide a signal voltage $e_O$. However, if an axial vibration caused a change in the axial air gap 64, the change will affect both magnetic circuits in the same sense. That is, if the axial air gap 64 was decreased, it would provide an increase in flux change of essentially the same amount at leg 104 as that at leg 108. The in phase induced voltages in windings 162 and 164 will subtract and essentially no output voltage will appear across terminals $T_1$ and $T_2$. This sensor assembly provides a high signal-to-noise ratio during the operation of sensing the angular rotation of wheel 50.

Alternative Embodiments

Figure 4:
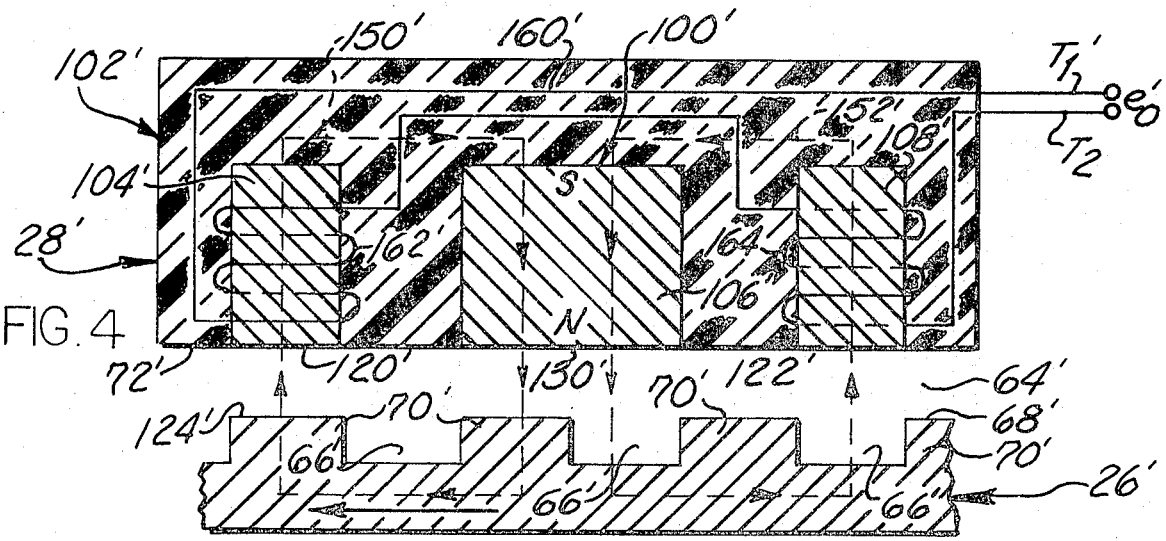
FIG. 4 is a view similar to that of FIG. 3 illustrating a second embodiment of the improved sensor assembly.

Reference is now made to FIG. 4 which presents an alternative sensor assembly constructed in accordance with the present invention. For purposes of simplicity, like components in FIGS. 3 and 4 are identified with like character references with those in FIG. 4 being designated with a prime, such as stator 28'. This embodiment mainly differs from that of the embodiment of FIG. 3 by the exclusion of strap member 110. Thus, the magnetic circuit for each path 150' and 152' includes two air gaps; to wit, the axial air gap 64' as well as a gap taken through the potting material 102'. Although the extra air gaps may detract somewhat from the magnitude of the reluctance change there is, however, sufficient change so that an output voltage $e_0$ is obtained when the induced winding voltages are out of phase. Variations in the length of the axial air gap 64' are compensated for in the same sense as that of the embodiment of FIG. 3.

Figure 5:
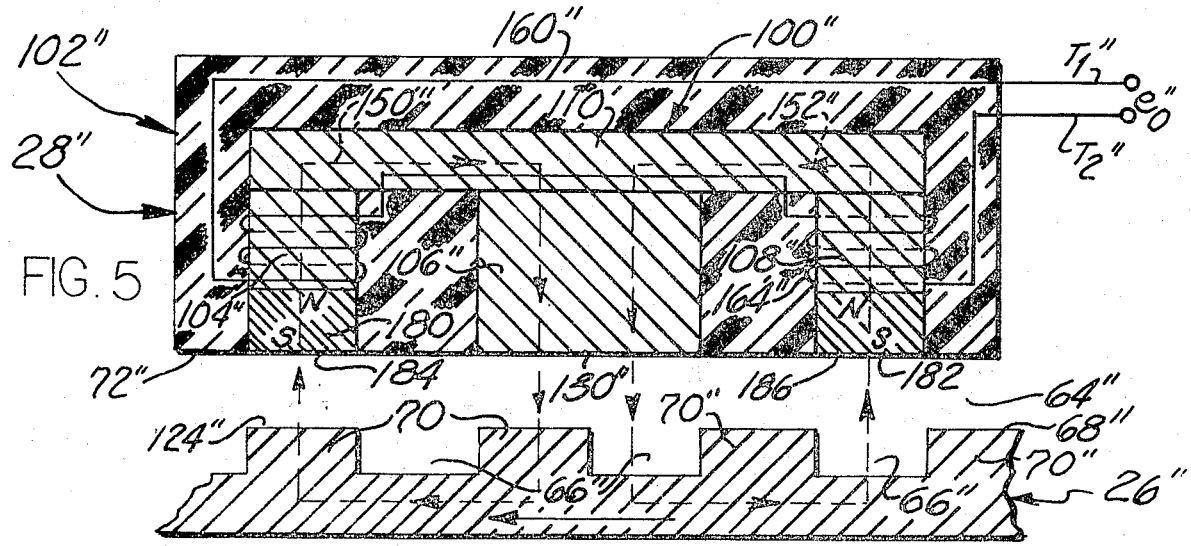
FIG. 5 is a view similar to that of FIG. 3 and illustrating another embodiment of the sensor assembly.

Reference is now made to the embodiment of FIG. 5. This embodiment is similar to those illustrated in FIGS. 3 and 4, and consequently, like components are identified with like character references with the exception that the like components in FIG. 5 are identified with a double prime, i.e., stator 28''. Stator 28'' employs an E frame 100'', having legs 104'', 106'' and 108''. In this embodiment, each leg 104'', 106'' and 108'' is constructed of ferromagnetic material and is secured at one end, as by welding, to a strap 110'', also constructed of ferromagnetic material. However, legs 104'' and 108'' are of shorter length than that of leg 106''. Permanent magnets 180 and 182 are mounted so as to serve as extensions of legs 104'' and 108''. These magnets having flat pole faces 184 and 186 with each pole face having a surface area corresponding essentially with that of a rotor pole face 124. Magnets 184 and 186 may be secured to legs 104'' and 108'' although this is not required. The magnets serve to provide a source of magnetic flux in the same sense as magnet 106 in FIG. 3; to wit, a split magnetic circuit is provided as indicated by paths 150'' and 152'' and with the direction of the magnetic flux being indicated by the arrows. The center leg 106'' is of ferromagnetic material and is included within each magnetic path 150'' and 152'' in the same sense as the permanent magnet 106 in the embodiment of FIG. 3. This leg has a pole face 130'' having a surface area approximately twice that of a rotor pole face 124. The E frame member 100'' together with coil 160'' thereon may be encapsulated in suitable potting material 102'' as in the embodiments of FIGS. 3 and 4 so as to form a rectangular shape stator housing with winding terminals $T_1$'' and $T_2$'' being exposed for connection with the anti-skid control circuitry of FIG. 1. The operation of the embodiment of FIG. 5 is essentially the same as that described hereinbefore with reference to FIGS. 3 and 4 in that out of phase induced voltages are obtained during rotor rotation to provide an output voltage $e_0$'' exhibiting a frequency proportional to that of angular velocity of rotor 26. Variation in the length of the axial air gap 64'' causes in phase induced voltages at windings 104'' and 108'' that tend to cancel to achieve a high signal-to-noise ratio.

In each of the embodiments described hereinabove with reference to FIGS. 3, 4, and 5, there has been provided an improved sensor assembly that includes a rotor constructed of ferromagnetic material having an annular array of rotor teeth which interrupt a magnetic field so as to cause induced voltages which are 180° out of phase. The sensing coil windings are interconnected so that out of phase induced voltages are additive to provide signal information. This signal information is in the form of an alternating voltage which exhibits a frequency in dependence upon the angular velocity of the rotor. The signal strength varies with the size of the axial air gap. However, variations in the length of the axial air gap during running conditions causes in phase induced voltages in the two windings. These voltages oppose each other and tend to cancel. The summation output voltage taken from the two windings is essentially free of noise due to variations in the length of the axial air gap and consequently provides a varying output signal exhibiting a frequency proportional to angular wheel velocity while, at the same time, exhibiting a very high signal-to-noise ratio.

Whereas the invention has been described in conjunction with preferred embodiments, it is to be appreciated that various modifications and arrangements of parts may be made without departing from the scope of the invention as defined by the appended claims.

I claim:

1. An anti-skid system for relieving brake forces applied to at least one independently rotatable wheel in response to a skid signal comprising:

anti-skid control circuit means for providing a said skid signal in dependence upon a received wheel speed signal representative of the wheel speed of a said wheel;

wheel speed signal generating means including a variable reluctance wheel speed sensor, said sensor including a stationary stator and a rotor adapted to be mounted on said wheel for rotation therewith in close proximity to said stator and cooperating with said stator to define an air gap therebetween;

said rotor including an annular ferromagnetic member having an annular array of teeth with adjacent teeth being separated by a recess, each said tooth extending toward said stator and terminating in a pole face having a width in the direction of rotation corresponding with the width in the same direction of each said recess;

said stator comprising means for defining a magnetic flux source and a split magnetic flux path, said defining means including spaced apart first and second leg members which define, at least in part, first and second magnetic circuits and a third member which defines a common magnetic path for said first and second magnetic circuits, each said first and second leg member having a pole face which faces said rotor and being spaced therefrom to define an air gap, said first and second leg members being oriented and configured such that the reluctance change in said first and second leg members caused by rotation of said rotor is essentially 180° out of phase and the reluctance change in said first and second leg members caused by a like change in said air gap spacing is essentially in phase, coil means for providing an output signal in dependence upon said reluctance changes such that essentially no output signal is provided when said reluctance changes are in phase.

2. An anti-skid system as set forth in claim 1 wherein said leg members are oriented such that when the pole face of said first leg member is in registry with a said rotor tooth the pole face of the second leg member is in registry with a rotor recess.

3. An anti-skid system as set forth in claim 2 wherein said means defining said magnetic flux source includes said third member, said first and second leg members being constructed of ferromagnetic material and serving as portions of said split magnetic path for said source.

4. An anti-skid system as set forth in claim 3 wherein said third member is a permanent magnet.

5. An anti-skid system as set forth in claim 3 wherein said coil means includes a first winding portion wound about a portion of the length of said first leg member and a second winding portion wound about a portion of the length of said second leg member, said winding portions being connected together in series such that induced voltages of opposite sense across said winding portions are additive whereas induced voltages of the same sense across said winding portions are subtractive.

6. An anti-skid system as set forth in claim 5 wherein said first and second leg members are circular in cross section to assist in tightly winding said winding portions thereabout.

7. An anti-skid system as set forth in claim 6 wherein said third member is a permanent magnet.

8. An anti-skid system as set forth in claim 7 wherein said members are supported in place by an encapsulating layer of non-conductive material.

9. An anti-skid system as set forth in claim 3 including a strap member constructed of ferromagnetic material and is included in said split magnetic path.

10. An anti-skid system as set forth in claim 9 wherein said strap member interconnects said first and second leg members.

11. An anti-skid system as set forth in claim 10 wherein said means defining said magnetic flux source includes first and second permanent magnets located proximate to the pole faces of said first and second leg members and serving as extentions thereof, said first, second, and third members being constructed of ferromagnetic material for defining first and second magnetic circuits such that said third member provides a common flux path for both circuits.

12. An anti-skid system as set forth in claim 11 wherein said coil means includes first and second winding portions respectively wound on said first and second leg members and interconnected such that induced voltages in said winding portions are additive when of opposite sense and are substractive when of the same sense.

13. An anti-skid system as set forth in claim 12, including a strap member of ferromagnetic material interconnecting said first, second and third members and included in said first and second magnetic circuits.

14. A wheel speed signal generator for providing a wheel speed signal representative of angular velocity of a wheel and including a stationary stator and a rotor adapted to be mounted on a said wheel for rotation therewith in close proximity to said stator and cooperating with said stator to define an air gap therebetween; said rotor including an annular ferromagnetic member having an annular array of teeth with adjacent teeth being separated by a recess, each said tooth extending toward said stator and terminating in a pole face; said stator comprising means for defining a magnetic flux source and a split magnetic path, said defining means including spaced apart first and second leg members and a common flux path third member, said first and second leg members being oriented so that each has a pole face which faces said rotor and spaced therefrom by said air gap; said leg member pole faces being oriented and configured such that when the pole face of said first leg is in registry with a said rotor pole face, the pole face of said second leg member is in registry with a said rotor recess so that during rotation of the rotor the reluctance change in said first and second leg members is 180° out of phase and when the said air gap is changed, the said reluctance change is in phase; and means for providing an output signal having a maximum value only when the reluctance change in said first and second legs is out of phase by essentially 180°.

* * * * *